United States Patent [19]

Sidelnikov et al.

[11] 3,984,015

[45] Oct. 5, 1976

[54] CRUSHED ROCK LOADING MACHINE

[76] Inventors: Vasily Grigorievich Sidelnikov, prospekt Entuziastov, 19, kv. 6; Evgeny Grigorievich Fursov, prospekt Druzhby, 61, kv. 112; Pavel Sergeevich Ratushnyak, ulitsa Gorkovskaya, 59, kv. 5; Gennady Petrovich Kopyshev, prospekt Druzhby, 62, kv. 29; Leonid Semenovich Kosterin, prospekt Druzhby, 61, kv. 106; Vasily Ivanovich Timofeev, ulitsa Kutuzova, 98, kv. 49; Viktor Andreevich Kovalenko, prospekt Metallurgov, 25, kv. 128, all of Novokuznetsk; Vitaly Antonovich Poltavets, ulitsa Karla Marxa, 47, kv. 38; Vasily Mikhailovich Slupitsky, ulitsa Kharitonova, 1B, kv. 87, both of Krivoi Rog, all of U.S.S.R.

[22] Filed: Feb. 28, 1975

[21] Appl. No.: 554,216

[52] U.S. Cl. ............................ 214/90 R; 198/511
[51] Int. Cl.² ........................................ B65G 65/04
[58] Field of Search ............. 214/90 R, 90 A, 91 R; 198/7 R, 10, 11

[56] References Cited

UNITED STATES PATENTS

| | | | |
|---|---|---|---|
| 1,908,967 | 5/1933 | Fitzsimons | 214/90 R |
| 2,844,240 | 7/1958 | Buck | 198/7 R |

*Primary Examiner*—Robert G. Sheridan
*Attorney, Agent, or Firm*—Haseltine, Lake & Waters

[57] ABSTRACT

The present invention relates to crushed rock discharging machines and can most advantageously be used for loading of blasted rock in mines where loose rock is released from a stope place through an outlet opening to a mine working floor on which the machine of the present invention is located.

The machine of this invention comprises a carriage mounting a pivoting body with a boom in the form of two parallel brackets whereon an operating unit is suspended and allowed to turn in the vertical plane. The operating unit is composed of two guide plates interconnected by a beam in the top section, and by a wedge-shaped cross-bar whereto a conveyor is joined. The operating unit includes at least two arms attached to brackets, allowed to turn in the vertical plane and mated with the outer surfaces of the guide plates in such a manner that the mating surfaces of the arms and guide plates are mutually congruent.

6 Claims, 6 Drawing Figures

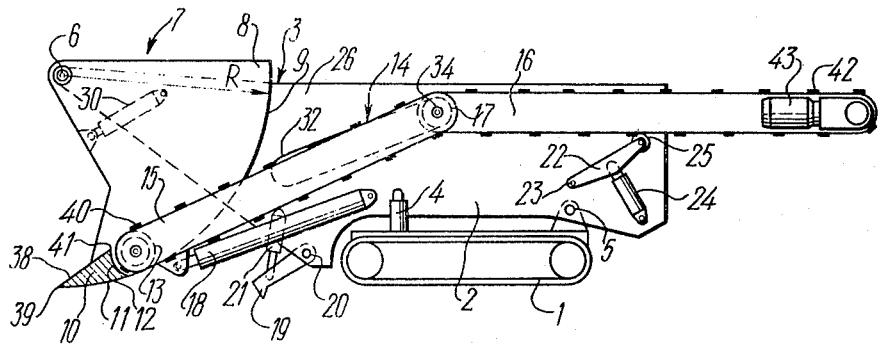

CRUSHED ROCK LOADING MACHINE

BACKGROUND OF THE INVENTION

The present invention relates to the ore mining industry and, more particularly, to machines for discharging crushed rock.

The machine of the present invention is of particular advantage for loading of blasted rock in mines in which loose rock is released from a stope place through an outlet opening to a mine working floor where the machine is located. Crushed rock flows by gravity into an operating unit of the machine, is caught, extracted and transferred to the discharge area by travelling aprons of a conveyor.

Known in the art are loading machines, the operating unit of which is made in the form of a bucket, pan, shovel, rotating gathering heads, etc. These are located adjacent to a conveyor, with the operating unit dug-in under crushed rock along a straight path. The bucket, pan, shovel, rotating gathering heads, etc., transport the rock to the joined conveyor section which carries it to the discharge area. The crushed rock is hauled to the conveyor by virtue of mechanical movements or jigging of the bucket, pan, or shovel toward the face, with the operating unit deepened only slightly under the broken rock to be loaded during the operating procedure.

The construction and operating principle of the operating units of the prior-art machines do not provide for full utilization of gravity of crushed rock for self-loading of the conveyor, and great potentialities of travelling aprons in catching and extracting crushed rock from the pile cannot be fully exploited.

These disadvantages are substantially obviated in loading machines constructed in accordance with the USSR inventor's certificate No. 235697, class E 21f, 13/00.

The machines comprise a carriage and a swinging body with a boom in the form of two parallel brackets connected to the body by means of hydraulic jacks a hinge, and allowed to turn in the vertical plane for setting the boom to the transport and operating positions. Suspended from the inner sides of the bracket by means of a shaft is an operating unit capable of turning in the vertical plane and serving to dig-in under loose rock on the floor, with the operating unit composed of two sector-shaped guide plates furnished with arched rear edges and interconnected by a beam in the upper section, and by a wedge cross-bar in the lower section, and with a recess made in the rear wall. Placed beside the recess, and hinged to the guide plates, is a driven roller of the conveyor comprising a hinge-jointed intake section for catching and extracting of crushed rock located above the section after the section is deepened, and a discharge section for hauling the rock to the discharge area, with the latter section installed on rollers and allowed to move horizontally within the body of the machine.

In order to remove the stresses acting on the carriage during turrning motion of the operating unit dug into crushed rock, and to improve adhesion between the machine and the floor, the boom is fitted with supports capable of displacement in the vertical plane, and of contact by their noses with the mine working floor.

In the machines, the construction and method of attaching of the operating unit, provide for digging-in the conveyor under the loose rock pile to a depth sufficient for effective self-loading, and permit setting the operating unit in a position, wherein broken rock can be gathered and extracted. Under favorable conditions, the machines develop a loading rate exceeding that of any other known loading machines operating under similar conditions. However, sometimes the efficiency of the machines is not as high. This is ascribed to the fact that flow of rock to the conveyor is periodically interrupted because large lumps of rock cause choking in the process of rock flow from the outlet opening. Commonly, the chokes take place in the area where the lumps are released from the outlet opening or in the area where the conveyor intake section is immersed under the pile.

Chokes in these areas are eliminated using the operating unit which disturbs the rest points and cohesion of the choked rock. For this purpose, the operating unit dug deep into the pile is turned in the vertical plane several times if required, or is retracted from under the pile to the initial extreme rear position, and then immersed again under the crushed rock in any given place along the loading area. The conveyor can be switched on or off as required, but in both cases the operating unit does not accomplish the principal work, i.e. loading, or is operating with low efficiency.

Besides, the efficiency of the machines depends on the incline of the conveyor preset in the extreme rear or extreme forward position, and also on the size of the inlet hole in the operating unit located between the guide plates, on the beam associated with the guide plates, and on the conveyor intake section. The smaller the incline of the conveyor in these positions, or in intermediate positions, and the larger the area of the inlet hole, the higher the capacity of the conveyor in gathering and extracting crushed rock from under the pile and, hence, the higher the flow capacity of the operating unit inlet hole, including the capacity to admit large-lumped rock. In the prior-art machines, the overall length and height thereof are reasonably small for mine workings, but the incline of the intake section of the conveyor in the operating positions is practically constant and inadmissible for use of belt conveyors, and close to admissible for use of flight conveyors, in respect to the extraction factor, for use of chain conveyors, because the conveyor intake and discharge section connecting hinge is arranged and displaced horizontally in guides fitted into the machine body. In addition, location of the hinge joint of the conveyor intake and discharge sections in the horizontal guide influences the position of the travelling apron with the operating unit placed to the extreme forward position. The conveyor in above machines is always kinked in the area of the hinge joint, which affects the working conditions of the conveyor.

Apart from clearing the above-mentioned chokes, the machines accomplish other auxiliary operations before the principle operating procedure, i.e. loading, may be started. The machines accomplish cleaning and mucking of the mine working floor when transferred from one face to another, sweep the rock thrown over the working at explosion, and shape piles or rock directly in the face to permit digging in the operating unit to a desired depth. For this purpose, the operating unit and machine itself must be maneuvered along the width of the working and the loading area. When the operating unit makes turns, and the machine is moved on the carriage in the required direction, large lumps of rock getting under the carriage must be removed by additional maneuvers of the machine and operating unit since the width of the area cleaned by the machine in a single run is not wider than the width of the operating unit. The portions of crushed rock raked in one run are rather small and there are no provisions for feeding crushed rock to the conveyor intake section from the sides of the conveyor. Hence, the efficiency of the machine in auxiliary operations is low. As a consequence, the machine suffers from the following disadvantages.

The principle disadvantage resides in the fact that the clearing of stoppages caused by lumps of loose rock in the supply of rock to the conveyor intake section from the outlet opening, is accomplished by the operating unit alone, with the result that the efficiency of the machine during work time goes down. There are no provisions for effective control of flow of crushed rock released from the outlet opening, and for simultaneous clearing of the chokes independently of the operating unit without detaching it from the principal rock handling procedure.

Another disadvantage resides in the fact that the operating unit of the machine is to be maneuvered redundantly along the loading area for the purpose of loading the conveyor intake section, with loose rock on both sides of the section during the principle operation, as well as during auxiliary operations described above.

Still another disadvantage is that the carriage of the machines is not protected against the ingress of large lumps of rock under the bottom. In order that the machine be moved in the desired direction, a plurality of maneuvers must be accomplished by the operating unit and by the machine for removing large lumps from under the carriage.

A further disadvantage, inherent in the machines, resides in the fact that during movement of the machine in the required direction at mucking of the mine working floor, only small portions of crushed rock are accumulated in front of the operating unit, so that much time is required for cleaning large areas.

Another disadvantage lies in the fact that owing to a low height clearance between the operating unit attachment shaft and the conveyor intake section, the flow capacity of the operating unit inlet hole between the operating unit shaft, conveyor and guide plates is low, with the result that the efficiency of the machine falls.

Still another disadvantage resides in that the rate at which the conveyor gathers and extracts crushed rock from under the pile is too low, because the incline of the conveyor intake section in the horizontal plane is nearly equal to the limit tolerance, with respect to the extraction factor, when the operating unit is in the extreme forward position, and also because the incline cannot be reduced with the existing limited height and length of the machine (due to horizontal displacements of the hinge joints of the conveyor sections).

A further disadvantage lies in the kinking of the conveyor in the area of the hinge joint between the inclined and horizontal sections when the conveyor is set to the extreme forward operating position, i.e., to the high-duty position, with the result that the operating conditions of the conveyor are impaired.

It is therefore a primary object of the present invention to provide a modified loading machine free from the above mentioned disadvantages, wherein the gravity of crushed rock released from the stope area is turned to useful account, with crushed rock gathered, extracted, and transferred to the unloading area by the conveyor, with the machine thus enabled to remove rock from under the outlet opening at a still higher rate. Therewith, thee overall dimensions of the machine of the present invention do not exceed the overall dimensions of loading machines used for the same purposes.

An additional object of this invention is to provide a machine wherein the flow rate may be accelerated and, among other things chokes in the area of the outlet opening and conveyor intake section may be eliminated without repeated detachment of the operating unit from the principle work for clearing purposes.

A further object of the present invention is to provide a machine wherein there are provisions for feeding crushed rock from both sides of the conveyor to the intake section.

Still another object of the present invention is to provide a machine capable of bulldozing a wide area in one run at cleaning of mine workings without redundant manipulations of the operating unit and machine along the loading area with the running gear protected against the ingress of large lumps of broken rock under the bottom.

The invention is also aimed at providing a machine with a higher flow rate of the operating unit inlet hole formed between the unit attachment shaft, side guide plates and conveyor intake section, and, hence, with a higher efficiency and capacity of loading crushed rock, including large lumps.

Yet another object of the present invention is to provide a machine highly efficient in extraction of loose rock with the conveyor from under the pile.

The invention is also aimed at providing a machine having facilities for easier operation of the conveyor which is placed at loading to the extreme forward operating position wherein the rate of extraction of crushed rock from under the pile is maximum.

SUMMARY OF THE INVENTION

With these and other objects in view, a machine for discharging crushed rock herein proposed comprises a carriage mounting a swinging body with a boom in the form of two parallel brackets. The inner sides thereof receive a shaft carrying an operating unit allowed to turn in the vertical plane, used for digging in under broken rock flowing on the mine working floor, and formed by two jaws incorporating arched rear edges and linked by a beam in the upper section, and by a wedge-shaped cross-bar interconnecting the guide plates in the lower section, and having a recess in the rear wall whereto a conveyor driven roller is adjacent and is hinged to the guide plates, with a conveyor comprising an intake section for catching and extraction of crushed rock located above it after deepening into the pile, and a section for hauling rock to a discharge area, with the conveyor sections interconnected by a hinge joint, with at least two arms provided thereat, according to the invention, with the arms attached to the boom brackets, allowed to turn in the vertical plane for interaction with loose rock, and mated with the outer surfaces of the operating unit guide plates in such a manner that the surface of the arms and guide plates are congruent; therewith, the boom brackets incorporate guides inclined toward the wedge cross-bar when the latter is in the extreme rear position, with a hinge shaft of the conveyor sections fitted into the guides for adjustment of the conveyor incline at turning of the operating unit.

According to the invention, the machine shows a higher efficiency during the work time as compared to the known machines because the operating unit is not as frequently used for auxiliary operations accompanying the principle handling procedure, and is more intensively employed in accomplishment of the main work, i.e., direct discharge of broken rock, and also because the conveyor provides for a higher rate of catching and extraction of rock from under the pile.

Owing to the use of the arms capable of turning in the vertical plane and made congruent with the guide plates in the area where they are mated, the rate of flow of broken rock from the outlet opening on the conveyor intake section is accelerated. Thus, the arms permit clearing of chokes occuring in the area of the outlet opening and conveyor intake section during flow of crushed rock, which is achieved by disturbing the points of rest of choked rock and flow stoppage. When turned, the arms deliver crushed rock to the area of the intake section of the conveyor from both sides of the conveyor bulldoze loose rock and protect the carriage from the ingress of large lumps of rock under the bottom during mucking of the mine working floor.

Inasmuch as the guides accommodate the hinge shaft interconnecting the conveyor intake and discharge sections in the boom brackets, and are directed so as to permit readjustment of the conveyor incline, the angle of incline of the conveyor and of the conveyor intake section in particular, can be reduced to minimum at turning of the operating unit and at placing it to the extreme forward position where the rate of catching and extraction of crushed rock from under the pile is maximum. As a result, the efficiency of the conveyor rises and an increase is achieved in the flow capacity of the operating unit inlet hole formed by the cross beam of the operating unit, grude plates and intake section of the conveyor wherein the clearance between the cross beam and conveyor section goes up. Consequently, the chokes in the area of the conveyor intake section are not so frequent when broken rock is supplied thereto, and the intake and discharge sections may be placed along the straight line in the extreme forward position where the loading rate is maximum.

Besides, each arm is turned, according to the invention, by an individual drive in the form of a hydraulic jack, one end thereof is hinged to the respective bracket of the boom, while the other is hinged to the associated arm, therewith the arms turn through an angle which is at least equivalent to the angle of turn of the operating unit from the extreme rear position to the extreme forward position.

Individual drives in the form of hydraulic jacks used in the machine for developing a required force to turn the arms which are more compact and reliable in operation, enable the arms to act on broken rock independently of the operating unit and of each other, or jointly in various combinations of the components, with the arms turned through an angle at least equal to that of the operating unit, whereby the rest points of chokes are disturbed and crushed rock is supplied to the area of the conveyor intake section.

In addition, the arms as well as the guide plates of the operating unit are shaped, according to the invention, as sectors, the central angle thereof is less than 90°, and the sector curve length in each arm is equal to that of each guide plate including the length of the arched bottom surface of the wedge-shaped cross-bar, therewith, the radii of the sectors are equal to each other, and the respective centers of turn coincide, whereas the side edge of each arm is congruent with the wedge-shaped cross-bar in the area where they are mated. As a result, the arms can be deepened into broken rock at swinging motion while they are in permanent contact with the working floor, with the result that crushed rock on both sides of the arms cannot enter the space under the arms and operating unit.

Apart from the above, the arms set to the extreme rear position, and the wedge-shaped cross-bar set to the same position, form, according to the invention, a front surface with an integral digging edge, and the width of the arms is correlated with the width of the operating unit and carriage, and with the effective interaction with the broken rock.

With the arms and wedge-shaped cross-bar of the operating unit forming an integral digging edge when set to the extreme rear position, broken rock can be raked together by the edge at mucking of the mine working floor so that sufficient portions of rock can be accumulated in one run of the machine in front of the operating unit, in which case broken rock can be caught by the conveyor more efficiently than in the event of raking with the operating unit alone. Hence, the width of the bulldozed surface must not be less than that of the carriage, and the width of the gathering arms must be sufficient to permit effective interaction between the arms and rock in all operations accomplished with the use of the arms.

In addition, the guides are made, according to the invention, on the inner sides of the boom brackets, wherein the incline, location and length of the guides are selected so that, with the operating unit turned to the extreme forward position, the incline of the conveyor intake section is minimum, and the conveyor sections are placed in a straight line.

The guides in the boom brackets are located and directed downward relative to the longitudinal axis of the machine in such a way that during turns of the operating unit to various positions and, particularly, to the extreme forward position, the hinge joint of the conveyor section is caused to move down. Hence, the incline and the turn angle of the conveyor hinge joint decrease, and after the conveyor is placed to the position of high-rate discharge, its incline is equal to at least 12° with the conveyor sections set along a straight line, whereas in the rear position the incline is equal to at least 16° and the kink angle is small, with the result that a higher efficiency of the conveyor in extracting crushed rock from under the pile is reached, and the conveyor apron in the maximum-rate discharge position is allowed to operate under favorable conditions.

The invention will now be described in greater detail with reference to preferred embodiments thereof taken in conjunction with the accompanying drawings.

BRIEF DESCRIPTION OF THE DRAWING

FIG. 1 is a side view of an embodiment of the crushed rock discharging machine of the present invention, with the operating unit set to the extreme rear operating position;

FIG. 2 is a plan view of the same embodiment;

DESCRIPTION OF THE PREFERRED EMBODIMENTS

Figure 3:
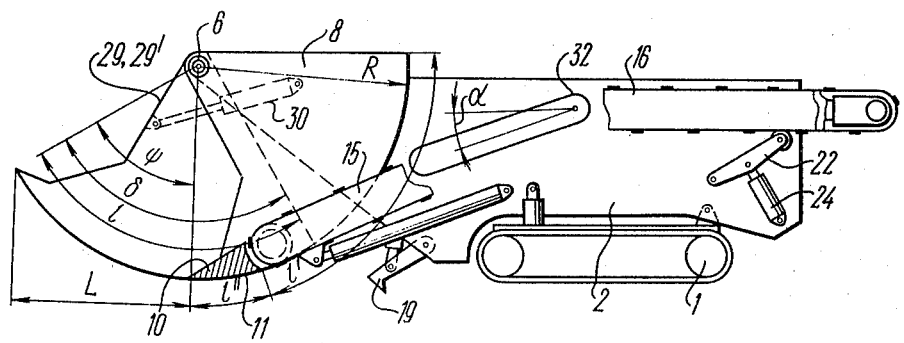
FIG. 3 is a side view of an embodiment of the machine of the present invention, with the right arm extended.

Referring now to FIG. 1, the machine comprises a carriage 1 which mounts a pivoting body 2 with a boom 3. Hydraulic jacks 4 permit turning the body in the vertical plane about a hinge joint 5 for lifting and lowering the boom 3. Attached to the top portion of the boom 3 by means of a shaft 6, is an operating unit 7. It comprises two parallel sector-shaped guide plates 8 and 8' (better shown in FIG. 2) provided with an arched rear edge 9. The arched guide plates permit turning the operating unit 7 about shaft 6, with the edges permanently pressed against the mine working floor to prevent the entry of crushed rock from the sides under the operating unit 7 during turning motion.

The guide plates 8 and 8' are rigidly interconnected in the lower section by a wedge-shaped cross-bar 10, the bottom surface 11 thereof is arched. The arched edges 9 of the guide plates 8 and 8' of the operating unit 7, joined to the bottom surface 11 of the cross-bar 10, have an equal radius R, and the center of the arched guide plates lies on the axis of the shaft 6.

The rear wall of the cross-bar 10 incorporates a recess 12 whereto a driven roller 13 of a conveyor 14 is adjacent, with the conveyor arranged between the guide plates 8 and 8'. The shaft of the driven roller 13 is hinged to the guide plates 8 and 8'. The conveyor comprises an intake section 15 for gathering and extracting of crushed rock after digging in the operating unit under the pile, and a discharge section 16 for hauling the crushed rock to the discharge area. The sections 15 and 16 are interconnected by means of a hinge joint 17.

The operating unit 7 is suspended by the shaft 6. It is allowed to turn in the vertical plane for digging in the intake section 15 under crushed rock released on the floor, through immersing the section to a required loading depth by making one turn of the conveyor 14 from the initial extreme rear position to the extreme forward position. The operating unit 7 is turned by at least one hydraulic cylinder 18, one end thereof is hinged to the body 2 while the other end is hinged to the bottom part of the intake section 15 of the conveyor 14.

The machine incorporates at least two rests 19 with noses attached to the boom 3 by means of hinge joints 20 and a hydraulic jack 21, with the rests capable of turning in the vertical plane till they contact the floor with their noses. The rests 19 serve to take up the stress acting on the carriage 1 and to improve adhesion between the machine and the floor at the turning movement of the operating unit 7 displaced through the pile of crushed rock.

The discharge section 16 of the conveyor comprises a height adjusting device which permits the use of transport facilities of different height. The device comprises a beam 22 which is turned in the vertical plane about a hinge joint 23 by a hydraulic jack 24. The top end of the beam 22 carries rollers 25 whereupon the discharge section 16 of the conveyor 14 is displaced.

The boom 3 incorporates two brackets: a right bracket 26 and a left bracket 27 (FIG. 2) which are interconnected by the shaft 6. The guide plates 8 and 8' of the operating unit 7 are interconnected by the cross beam 28. The cross beam protects the shaft 6 against knocks of large lumps of broken rock during irregular flow, to limit excessive portions of rock delivered to the intake section 15, and to protect the latter against knocks of large lumps when they break down with the flow of crushed rock out of the outlet opening, which commonly occurs while clearing chokes.

The machine incorporates at least two arms: a right arm 29 and a left arm 29' capable of handling crushed rock either independently of or jointly with the operating unit 7, with the arms attached to the right and left brackets 26 and 27 of the boom 3 and allowed to turn in the vertical plane about the shaft 6. Side surfaces of the arms 29 and 29' are mated with the guide plates 8 and 8' of the operating unit 7, respectively. The surfaces are mated at a possibly close distance to reduce the ingress of small fractions of rock between the mated surfaces during accomplishment of turns. The mating surfaces of the arms 29 and 29', and of the guide plates 8 and 8' are congruent.

The arms 29 and 29' are turned by individual hydraulic jacks 30 and 31 hinged to the right bracket 26 and left bracket 27 of the boom 3, respectively, and to the associated arms.

The inner sides of the right bracket 26 and left bracket 27 are provided with a right guide 32 and a left guide 33. Fitted into the guides is a shaft 34 of the hinge joint 17, with rollers 35 and 36 serving to allow free movement of the shaft. The guides are inclined at the angle $\alpha$ (FIG. 3) to the longitudinal axis of the machine and are used for adjustment of the incline angle $\beta$ (FIG. 4) of the conveyor 14 when the operating unit 7 is turned through the angle $\phi$, whereat the intake section 15 of the conveyor can be immersed under the pile of crushed rock to an effective loading depth, with the conveyor in the forward position inclined through the minimum angle $\beta$. Besides, the angle $\beta$ depends on location and length of the guides 32 and 33.

The radius R (FIG. 3) of the side guideplates 8 and 8', the swing angle $\phi$ of the operating unit, and the wedge angle of taper $\theta$ (FIG. 4) of the wedge-shaped cross-bar 10 at a preset height of its rear wall in the area of mating of the driven roller 13 of the conveyor 14, are correlated to one another as well as to the height of the outlet opening above the mine working floor, which in the first place influences the spread of broken rock on the mine working floor when rock is released thereon.

The parameters must be selected appropriately in such a way that the operating unit 7, moved by a single turn to the extreme forward operating position, provides a maximum thickness in the active layer of broken rock released from the outlet opening when the front surface 37 of the cross-bar 10 is placed to a position wherein crushed rock is allowed to creep down the cross-bar toward the driven roller 13 of the conveyor 14.

Figure 5:
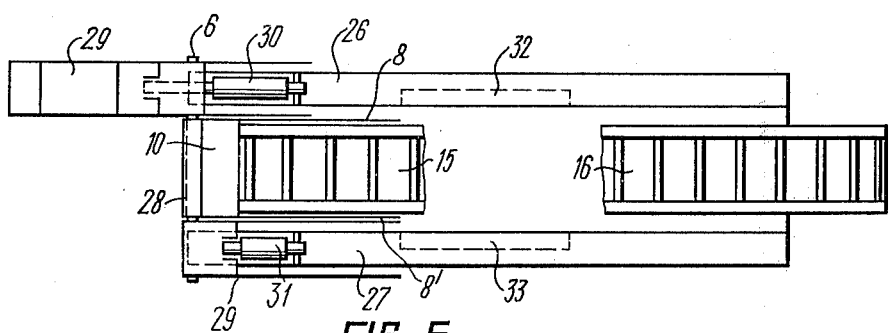
FIG. 5 is a plan view of the embodiment shown in FIG. 3.
Figure 4:
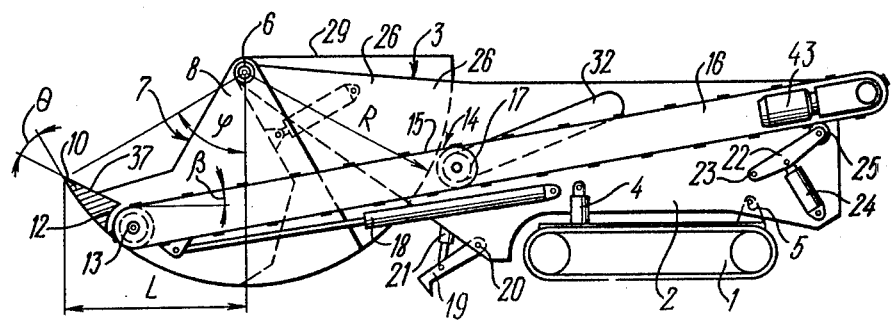
FIG. 4 is a side view of an embodiment of the machine of the present invention, with the operating unit in the extreme forward operating position.
Figure 6:
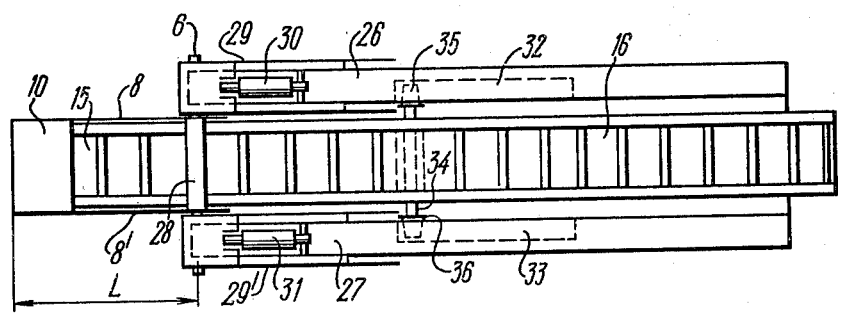
FIG. 6 is a plan view of the embodiment shown in FIG. 4.

Turning now to FIGS. 3 and 5, the hydraulic jacks 30 and 31 move the arms 29 and 29' around the shaft 6 through the angle $\psi$, which is at least equal to the swing angle $\phi$ (FIG. 4) of the operating unit 7, hence the length L, (FIG. 3) by which the arms 29 and 29' are extended under the pile, must at least be equal to the length L, by which the operating unit 7 is extended (FIGS. 4 and 6).

The arch length l of each arm 29 and 29' (FIG. 3) must be equal to the arch length l' of each guide plate 8 or 8' including the length l" of the bottom surface 11 of the cross-bar 10, with the radii R of the sectors equal to each other, and with the centers of turn of the sectors lying on the shaft 6. The side surface of each arm is congruent with the surface of the wedge-shaped cross-bar in the area where the surfaces are mated. The central angles of the sectors of the arms 29 and 29' must not exceed 90° so that the arm top edge is horizontal and is located below the shaft 6 of the arms and operating unit 7 when the arms are placed to the extreme rear position.

The left arm 29' and the right arm 29 in assembly with the wedge-shaped cross-bar 10 form a front surface 38 (FIG. 1) when they are set to the extreme rear position, with the surface provided with an integral digging edge 39 capable of bulldozing during motion of the carriage 1, thus raking broken rock at a width which at least is equal to the width of the carriage.

The driven roller 13 of the intake section 15 of the conveyor 14, adjacent to the recess 12 in the wedge-shaped cross-bar 10, permits free swinging of the conveyor 14 and limits the ingress of crushed rock into the area where they are mated. The diameter of the driven roller 13 is chosen so that the working surface 40 of the intake section 15 of the conveyor 14 is located at the level, or at least somewhat above, the rear top edge 41 of the cross-bar 10 in the area where the working surface is mated with the cross-bar, due to which extraction of broken rock by the working surface 40 of the conveyor 14 is improved.

The machine incorporates at least a double-chain belt apron. The pitch, $n$, of setting scrapers 42 (FIG. 2), the height of the scrapers, the speed of the conveyor apron, and other conveyor parameters, are predetermined in accordance with the operating conditions and desired efficiency of production of the machine. The intake section 15 and discharge section 16 of the conveyor 14 are actuated by a common drive 43 (FIG. 1).

All hydraulic jacks mentioned heretofore are driven by one or several hydraulic pumps operating from an oil-pumping station (not shown in the drawings). The machine is controlled remotely by means of a remote console (not shown in the drawings).

The machine operates as follows;

First the machine is transferred from the transport position to the operating position by lowering the body with the hydraulic jacks 4 to a position wherein the digging edge 39 of the wedgeshaped cross-bar 10 and the ends of the right and left arms 29 and 29' fully retracted and held together (in the initial position) come in contact with the mine working floor. To approach the main pile of loose rock under the outlet opening, the lumps of rock thrown about at explosion must be removed from the floor. For this purpose, the machine mounted on the carriage 1 is moved in the required direction, with the wedge-shaped cross-bar 10 of the operating unit 7 and with the arms 29 and 29' in the extreme rear position and in contact with the floor, for raking broken rock at a width exceeding that of the carriage 1. During bulldozing, the conveyor may either be engaged or disengaged. As crushed rock is accumulated in front of the operating unit 7 and arms 29 and 29', it is extracted by the conveyor 14 and is transferred to the discharge area, say, to a self-propelled car following the machine, or to other continuous transport facilities (such as a self-propelled elevating conveyor), which are preferable considering continuous operation and the high operating rate of the machine. In mucking the floor and wherever required, the operating unit 7 of the machine may repeatedly be turned about the shaft 6 through definite angles, whereat the raked portions of crushed rock can most easily be caught and hauled by the conveyor 14 after bulldozing. The operating unit can swing independently of the arms 29 and 29' which, in turn, can swing about the shaft 6 together with each other, together with the operating unit 7, or independently of each other for loading crushed rock located on the sides of the conveyor.

Bulldozing of the working floor, and loading of crushed rock, are continued until the digging edge 39, formed by the wedge-shaped cross-bar 10 of the operating unit 7 and by the arms 29 and 29', is placed in front of the bottom lip of the main pile of broken rock. The same procedure is used for shaping piles when the plane of its slope coincides with the crushed rock slope of repose.

For loading of crushed rock flowing from the outlet opening, the operating unit 7 and the arms 29 and 29' fully retracted, are placed in front of the bottom lip of the heap, the carriage 1 is started, and the operating unit and arms are dug in straight under the pile as deep as possible. To permit subsequent digging-in of the intake section 15 of the conveyor 14 for effective self-loading in one run, the digging-in depth must not be less than 0.5 to 0.7 m.

To deepen the conveyor 14 under the pile, for effective self-loading, and setting a high rate of flow of crushed rock extracted by the conveyor, the following procedure is employed. Using the hydraulic jacks 21, the rests 19 are pressed against the floor, and the operating unit is turned by the hydraulic jacks 18 about the shaft 6, until it sinks further into the pile and pulls the intake section 15 of the conveyor 14 and the associated section 16. The arms 29 and 29' remain at the extreme rear position. The intake section 15 swings about the hinge joint 17 and about the shaft of the driven roller 13. The shaft of the hinge joint 17 moves along the guides 32 and 33, causing the hinge joint 17 to move downward in order to reduce the incline of the intake section 15 of the conveyor 14 and to increase the clearance between the shaft 6 and the conveyor intake section 15. The operating unit stops turning at the instant when the intake section 15 of the conveyor 14, and the front incline surface 38 of the wedge-shaped cross-bar 10 deepened into the pile, are placed to a position where the thickness of the flowing crushed rock is maximum and the rate of extraction of rock out of the pile is high. The conveyor is started, and crushed rock lying above the intake section 15 of the conveyor 14 is continuously extracted and transported to the discharge area (preferably to continuous transport facilities, such as a conveyer system).

Loading is continued unless lumps of broken rock cause a stoppage in the area of the outlet opening or in the area of the conveyor intake section dug into the pile. Commonly, the chokes are cleared by the machine. However, explosives can be used for the purpose, especially in the case when a choke is located too high in the outlet opening for reaching it with the machine.

To clear a choke with the machine, the arms 29 and 29' are turned independently or together by the hydraulic jacks 30 and 31 about the shaft 6, without withdrawing the operating unit 7 from the pile, and without interrupting the principle hauling procedure. The chokes can be cleared by turning one of the arms together with the operating unit 7, by turning both arms 29 and 29' together with the operating unit 7, and at the worst, by swinging the operating unit alone deep in the pile of rock. In all cases, the points of rest of the choked rock and the adhesion of rock in the interrupted flow, are disturbed due to shearing of layers located under the choke area, flowing of crushed rock on the intake section, and extraction of rock by the conveyor. It is also possible to clear the chokes by digging the machine into the pile farther than the slope plane behind the choke, and by manipulating the components as described above.

In all operations accomplished by the machine, crushed rock located on the sides of the machine is loaded on the conveyor by swinging the arms 29 and 29'.

Whenever required, the discharge section 16 of the conveyor 14 can be lifted or lowered over the rollers 25 by means of the hydraulic jacks 24, depending on the height of transport facilities employed.

It is to be understood that, the form of the invention described above with reference to the drawings is to be taken as a preferred embodiment only. Various changes are possible in the shape, dimensions, and arrangement of individual components. It is possible to alter the width, speed, type and design, as well as other characteristics of the travelling apron, the shape, design, swinging radius and other parameters of the operating unit and arms, and finally, the type and design of the drives, running gear, and other components, without departing from the spirit and scope of the present invention as defined in the claims that follow.

The loading machines of the present invention and other embodiments with different dimensions, can be employed, apart from the mines, in quarries, bunkers, storage piles and in any other place where the gravity of flowing material can be utilized for loading the intake section of the conveyor.

What is claimed is:

1. A crushed rock discharging machine comprising a carriage; a body with rests and a boom mounted on said carriage, said body being allowed to pivot for setting said boom to stowed and operating positions; said boom being in the form of two parallel brackets; a drive for pivoting said body; a shaft fitted into said brackets; an operating unit suspended from inner sides of said brackets by means of said shaft and allowed to turn in the vertical plane for depending under crushed rock flowing on a mine working floor; a drive for turning said operating unit, said operating unit being composed of two guide plates, a beam, a wedge-shaped cross-bar and a conveyor, said guide plates having arched rear edges for preventing the ingress of crushed rock under said operating unit from the sides thereof when said unit is placed on the working floor and is dug under discharged rock, said beam serving to interconnect said guide plates in the upper section and to protect the operating unit against heavy blows when crushed rock breaks rapidly out of an outlet opening, said wedge-shaped cross-bar serving to interconnect said guide plates in the lower section and to dig in under crushed rock, said cross-bar having a rear wall with a recess, a driven roller of said conveyor hinged to said guide plates of the operating unit and located beside said recess at a minimum possible clearance to allow movement of the conveyor and, at the same time, to prevent entry of small fractions of rock into a space under said conveyor, the intake and discharge sections thereof being interconnected by means of a hinge joint for catching and extraction of crushed rock located above said intake section after said operating unit is dug in, and for hauling crushed rock, respectively; at least two arms attached to said boom brackets and allowed to swing in the vertical plane for interaction with crushed rock and mated with the outer surfaces of said guide plates, said mating surfaces of said guide plates and arms being congruent; guides in said boom brackets and inclined toward said wedge-shaped cross-bar at retraction of the latter to the extreme rear position for accommodating a shaft of said hinge joint of said conveyor incline upon swinging of said operating unit.

2. A machine as claimed in claim 1, including individual drive in the form of a hydraulic jack for turning of each of said arms, one end of said hydraulic jack being hinged to the respective bracket of said boom while the other end is hinged to the associated arm, the arms being turned through an angle which is at least equivalent to the angle of turn of said operating unit from the extreme rear position to the extreme forward position.

3. A machine as claimed in claim 1, wherein said arms and said guide plates of the operating unit are shaped as sectors, the central angle thereof not exceeding 90° and the arch length of each section of said arm being equal to that of each guide plate including the length of an arched bottom surface of said wedge-shaped cross-bar, the radiuses of said sectors being equal to each other, the centers of turn of said sectors being coincident, the side edge of each arm being congruent with the surface of said wedge-shaped cross-bar in the area whereat they are mated.

4. A machine as claimed in claim 3, wherein said arms set to the extreme rear position in assembly with said wedge-shaped cross-bar set to the same position form a front surface with an integral digging edge for bulldozing broken rock when the machine is moving toward a face.

5. A machine as claimed in claim 1, wherein the width of said arms is correlated with the width of said operating unit and is sufficient to form, together with the operating unit, a raking width exceeding the width of said carriage and sufficient to ensure effective interaction with crushed rock when the machine is operating.

6. A machine as claimed in claim 1, wherein said guides are located in the inner sides of said boom brackets, the incline, location and length being such that with said operating unit turned to the extreme forward operating position, the incline of said intake section of the conveyor is minimum while said sections of the conveyor are placed into one straight line for efficient operation of said operating unit.

* * * * *